United States Patent [19]

Kagami et al.

[11] Patent Number: 4,831,269
[45] Date of Patent: May 16, 1989

[54] PHOSPHORS AND FLUORESCENT COMPOSITIONS FOR EMISSION OF LIGHT UNDER LOW VELOCITY ELECTRON EXCITATION AND FLUORESCENT DISPLAY DEVICES UTILIZING THE SAME

[75] Inventors: Akiyasu Kagami, Kanagawa; Takashi Hase, Ebina, both of Japan

[73] Assignee: Kasei Optonix, Ltd., Tokyo, Japan

[21] Appl. No.: 810,229

[22] Filed: Dec. 18, 1985

[30] Foreign Application Priority Data

Dec. 18, 1984 [JP] Japan .................. 59-266816

[51] Int. Cl.$^4$ ............................. H01J 29/20
[52] U.S. Cl. .................. 250/484.1; 313/495; 252/301.6 S
[58] Field of Search ........... 250/484.1, 483.1; 313/486, 495; 252/301.6 S

[56] References Cited

U.S. PATENT DOCUMENTS 3,459,667 8/1969 Larach et al. .............. 252/301.6 S
4,208,612 6/1980 Hase et al. ...................... 313/495
4,499,005 2/1985 McColl et al. ............. 252/301.6 S

FOREIGN PATENT DOCUMENTS 691039 5/1953 United Kingdom ......... 252/301.6 S
2039272 8/1980 United Kingdom ......... 252/301.6 S

OTHER PUBLICATIONS

Kröger, "Na & Li as Activators ... in ZnS", Ann. of the Optical Soc. of Amer., vol. 39, #8 (1949), p. 670.

Primary Examiner—Carolyn E. Fields
Assistant Examiner—Richard E. Hanig
Attorney, Agent, or Firm—Oblon, Fisher, Spivak, McClelland & Maier

[57] ABSTRACT

A phosphor for emission of light under low-velocity electron excitation having the formula:

$$(Zn_{1-x},Cd_x)S:aLi,bM^I,cX \qquad (I)$$

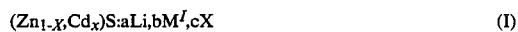

wherein $0 \leq x \leq 1$, $0 < a < 1 \times 10^{-2}$ g/g, $b \geq 0$, $c > 0$, $M^I$ is at least one element selected from the group consisting of Na, K, Ag, Rb, Cs, Au and Cu, and X is at least one element selected from the group consisting of Al, Cl, Br and I.

14 Claims, 3 Drawing Sheets

PHOSPHORS AND FLUORESCENT COMPOSITIONS FOR EMISSION OF LIGHT UNDER LOW VELOCITY ELECTRON EXCITATION AND FLUORESCENT DISPLAY DEVICES UTILIZING THE SAME

BACKGROUND OF THE INVENTION

1. Field of the Invention

The present invention relates to phosphors which can emit light of high luminance under low-velocity electron excitation, fluorescent compositions containing such phosphors, and low-velocity electron excited fluorescent display devices.

2. Description of the Prior Art

Zinc activated zinc oxide phosphors (ZnO:Zn) are well known as phosphors which can emit light of high luminance under excitation by low-velocity electron beams. When excited by low-velocity electron beams, the ZnO:Zn phosphors emit green-white light of high luminance, and they are practically used for fluorescent screens for low-velocity electron excited fluorescent display devices.

A low-velocity electron excited fluorescent display device (hereinafter referred to simply as a "fluorescent display device") comprises, basically, an anodic plate having a fluorescent screen on one side thereof and a cathode disposed face to face with the fluorescent screen in an evacuated tube, whereby the fluorescent screen on the anodic plate is excited by low-velocity electron beams (usually low-velocity electron beams at an acceleration voltage of at most 100 V) emitted from the cathode to emit light of high luminance. The fluorescent display devices having fluorescent screens composed of the above ZnO:Zn phosphors are widely used as display elements for table-top calculators, various meters and testers, etc.

In recent years, reflecting the expansion of the field of the application of the fluorescent display devices, a variety of emitting colors are desired for the fluorescent display devices. Various developments have been made on the phosphors which are capable of emitting light other than green light under low-velocity electron excitation. As a result, there have been developed some phosphors which are capable of emitting colored light other than green light under low-velocity electron excitation. Among them, there are $(Zn_{1-x},Cd_x)S$ phosphors represented by a specific example of the composition of $(Zn_{1-x},Cd_x)S:Ag$.

For the preparation of such $(Zn_{1-x},Cd_x)S$ phosphors, it is known to employ NaCl, as disclosed by H. W. Leverenz in "An Introduction to Luminescence of Solids" pages 196-199, John Wiley & Sons, Inc., 1950, or in Japanese Unexamined Patent Publications No. 129480/1980 and No. 667381/1982.

Further, in the above-mentioned Japanese Unexamined Patent Publication No. 167381/1982, it is proposed to increase the Ag content in the phosphor in order to improve the luminance of a low-velocity electron excited fluorescent display device. On the other hand, Japanese Examined Patent Publication No. 33153/1984 proposes to use a fluorescent composition composed of a mixture of a phosphor and a conductive material such as $In_2O_3$ having a small particle size in order to achieve the same object.

However, it is now desired to further improve the luminance of the light emitted by a fluorescent display device during its use under low-velocity electron excitation i.e. at a low voltage and low electric power, in connection with a recent tendency for color display in the fluorescent display devices and an expansion of the field in which fluorescent display devices are used.

SUMMARY OF THE INVENTION

It is an object of the present invention to provide a phosphor which is capable of emitting light of high luminance under low-velocity electron excitation at an acceleration voltage of at most 1 KV, preferably at most 100 V.

Another object of the present invention is to provide a fluorescent composition which is capable of emitting light of high luminance under low-velocity electron excitation.

A further object of the present invention is to provide a fluorescent display device which emits light of high luminance under low-velocity electron excitation.

The present inventors have conducted extensive researches particularly on the above-mentioned $(Zn_{1-x},Cd_x)S$ phosphors among phosphors which are capable of emitting light when excited by low-velocity electron beams (hereinafter referred to as a "phosphor for emission of light under low-velocity electron excitation") in order to achieve the above object. As a result, it has been found that when excited by low-velocity electron beams, $(Zn_{1-x},Cd_x)S$ phosphors containing lithium (Li) exhibit emission of light with luminance far superior to the conventional phosphors containing no lithium despite their luminance under high velocity electron excitation is substantially equal or inferior to the luminance of the conventional phosphors. The present invention is based on this discovery. This discovery is extremely significant in that the addition of lithium provides a characteristic which is fundamentally different from the characteristics known before.

The phosphor for emission of light under low-velocity electron excitation of the present invention based on such a discovery, is represented by the formula:

$$(Zn_{1-x},Cd_x)S:aLi,bM^I,cX \qquad (I)$$ 

wherein $0 \leq x \leq 1$, $0 < a < 1 \times 10^{-2}$ g/g, $b \geq 0$, $c \geq 0$, $M^I$ is at least one element selected from the group consisting of Na, K, Ag, Rb, Cs, Au and Cu, and X is at least one element selected from the group consisting of Al, Cl, Br and I.

BRIEF DESCRIPTION OF THE DRAWINGS

FIG. 3 illustrates a diode, and FIG. 4 illustrates a triode.

DETAILED DESCRIPTION OF THE PREFERRED EMBODIMENTS

In the phosphors of the present invention, the desired improvement in the luminance is obtainable even when the lithium content is very small at a level almost equal to the limit for the detection by the conventionally available technique for analysis (1 ppm or less). The type and the combination of lithium salts to be used may optionally be selected. The upper limit for the lithium content is at a level of $10^{-2}$ g/g (10000 ppm) in view of the production technique presently available.

The lithium content is preferably within a range of from 1 to 7100 ppm relative to the phosphor matrix. More preferably, the content is within a range of from 35 to 5000 ppm.

Lithium may be incorporated not only as a simple substance but also in an optional form and number of lithium compounds such as metal salts, halides (Br,I) or oxides.

The phosphor of the present invention is usually prepared by the following method. Namely, a predetermined amount of an activator or a co-activator such as a monovalent halide (such as AgCl) or a trivalent metal salt (such as $Al(NO_3)_3$) is added to a powder mixture of sulfides obtained by mixing zinc sulfide (ZnS) powder and cadmium sulfide (CdS) powder in such a ratio that the ZnS powder is $(1-x)$ mol relative to x mol of the CdS powder, and a suitable amount of a lithium source such as lithium chloride (LiCl) is further added, and the mixture is fired in a sulfurizing atmosphere such as a hydro-sulfide atmosphere or a sulfur atmosphere at a temperature of from 500° to 1200° C. for from 0.2 to 5 hours, then thoroughly washed with a solvent such as water, dehydrated and dried.

Figure 1:
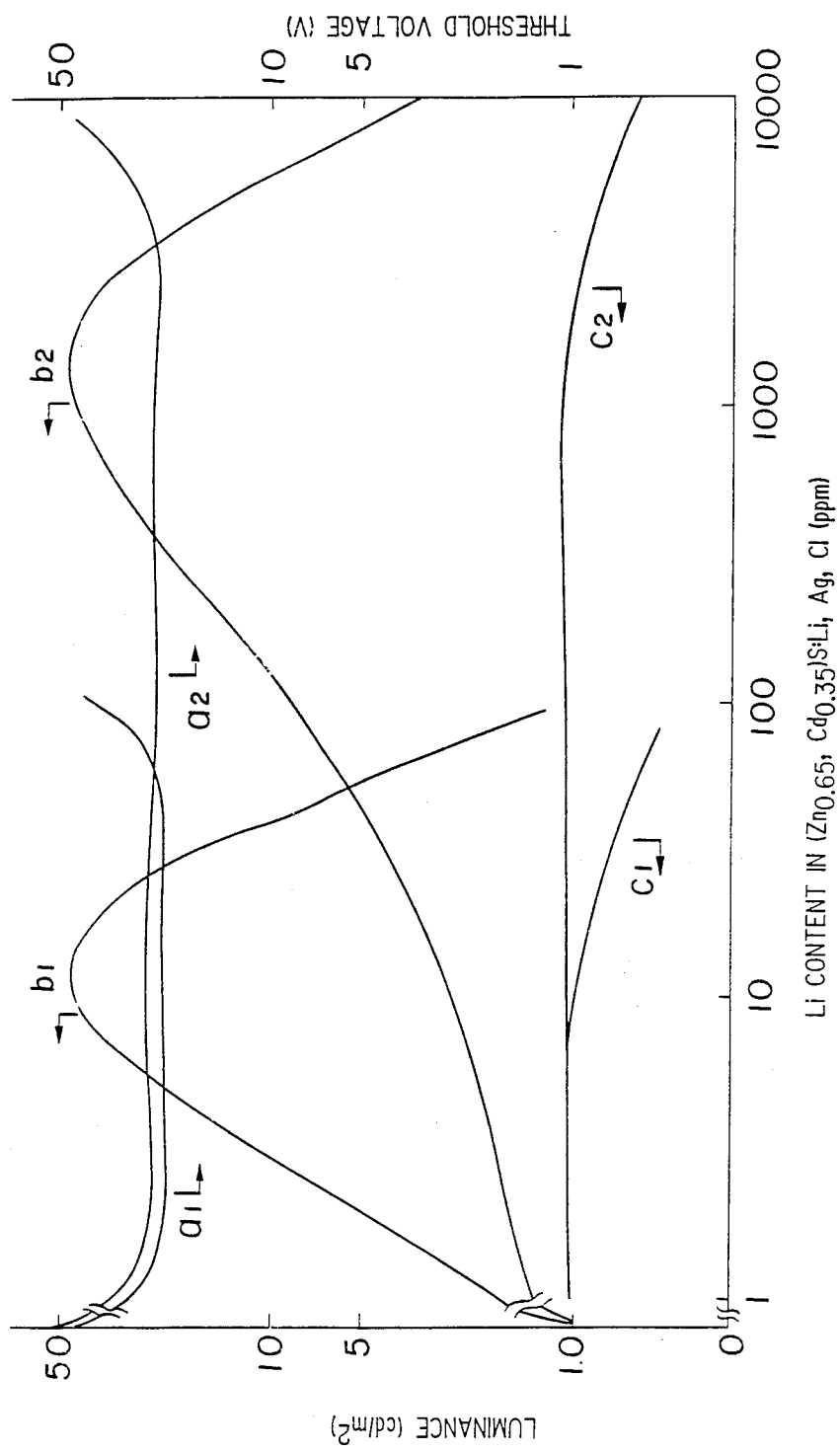
FIG. 1 is a graph showing the relation between the lithium content in a phosphor and the luminance and the relation between the lithium content and the change of the threshold voltage in a fluorescent display dvice having a fluorescent screen wherein a $(Zn_{0.65},Cd_{0.35})S:Li,Ag,Cl$ phosphor is used as the phosphor for emission of light under low-velocity electron excitation of the present invention.

FIG. 1 is a graph showing the relation between the lithium content in a phosphor and the characteristic values in a fluorescent display device having a fluorescent screen wherein a $(Zn_{0.65},Cd_{0.35})S:Li,Ag,Cl$ phosphor is used as an example of the phosphor for emission of light under low-velocity electron excitation of the present invention thus obtained.

In this Figure, curves $a_1$, $b_1$ and $c_1$ correspond to the above phosphor prepared by an addition of LiCl as the lithium salt, and curves $a_2$, $b_2$ and $c_2$ correspond to the above phosphor prepared by an addition of a mixture of NaCl, LiCl, $Li_2SO_4.H_2O$ and $Li_3PO_4.\frac{1}{2}H_2O$ in an equal molar ratio as a mixture of lithium salts. Curves $a_1$ and $a_2$ indicate the changes in the threshold voltage (i.e. the applied voltage required to obtain a luminance of 0.1 cd/m$^2$) depending upon the lithium content. On the other hand, curves $b_1$ and $b_2$ indicate the changes in the luminance depending upon the lithium content when the applied voltage was 50 V. Likewise, curves $c_1$ and $c_2$ indicate the changes of the luminance depending upon the lithium content when the applied voltage was 12 KV. In this Figure, the value at the lithium content 0 in each curve is the value measured by using the conventional phosphor containing no lithium. As shown in the Figure, by the incorporation of lithium into the phosphor, a decrease in the threshold voltage and an improvement in the luminance under low-velocity electron excitation were observed.

The fluorescent composition capable of emitting light under low-velocity electron excitation according to the present invention is a mixture of the above-mentioned phosphor for emission of light under low-velocity electron excitation of the present invention and a conductive material. The conductive material is at least one member selected from the group consisting of metal oxides and metal sulfides, such as $In_2O_3$, $SnO_2$, ZnO, CdS, $In_2S_3$, $Cu_2S$ or $Li_2S$. There is no particular restriction as to the amount of the incorporation of the conductive material. However, from the practical point of view, the conductive material is incorporated usually in an amount of from 0.1 to 50% by weight relative to the phosphor.

For instance, $In_2O_3$ to be used for the fluorescent composition of the present invention, may be the on which is industrially available. However, it is also possible to employ fired $In_2O_3$ obtained by firing an indium compound readily convertible into $In_2O_3$ at a high temperature such as a sulfate, a nitrate or a chloride in the air, in an inert atmosphere or in a weakly reducing atmosphere at a temperature of at most 1500° C., or pulverized $In_2O_3$ obtained by adequately pulverizing such fired $In_2O_3$. The average particle size of $In_2O_3$ is preferably at most 10 μm. Further, a substance which is capable of forming $In_2O_3$ under heating may preliminarily be deposited on the phosphor surface, and the mixing of $In_2O_3$ with the phosphor may be accomplished during the firing process.

Figure 2:
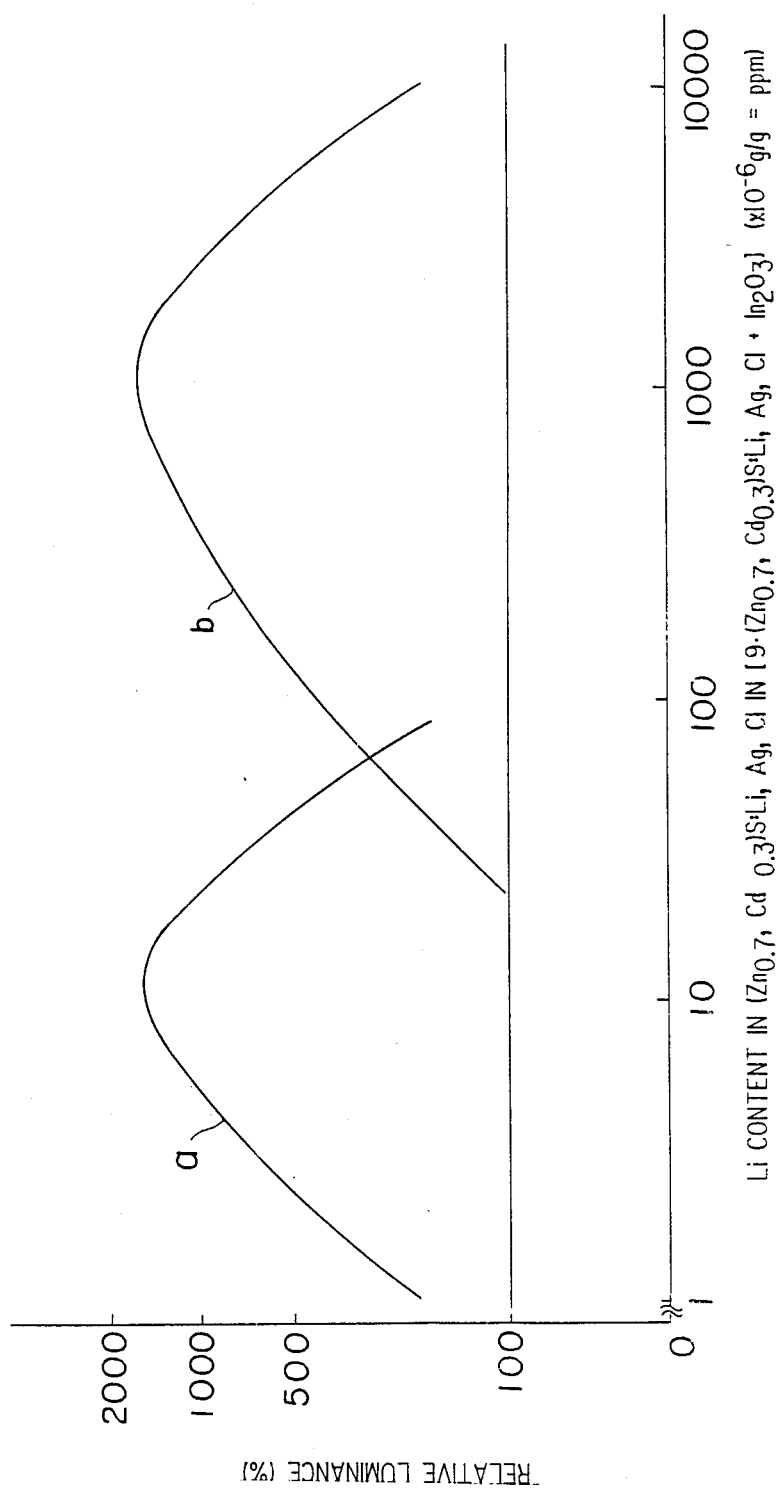
FIG. 2 is a graph showing the relation between the lithium content in a phosphor and the relative luminance under excitation at an exciting voltage of 30 V in a fluorescent display device having a fluorescent screen made of a fluorescent composition composed of a mixture of a $(Zn_{0.70},Cd_{0.30})S:Li,Ag,Cl$ phosphor and $In_2O_3$ in a weight ratio of 9:1 as the fluorescent composition of the present invention.

FIG. 2 is a graph showing the relation between the lithium content in a phosphor and the relative luminance under excitation at an exciting voltage of 30 V in a fluorescent display device having a fluorescent screen formed by a fluorescent composition composed of a mixture of a $(Zn_{0.70},Cd_{0.30})S:Li,Ag,Cl$ phosphor and $In_2O_3$ in a weight ratio of 9:1.

In this Figure, curve a corresponds to the fluorescent composition prepared by an addition of LiCl as the lithium salt. Likewise, curve b corresponds to the fluorescent composition prepared by an addition of a mixture of NaCl, LiCl, $Li_2SO_4.H_2O$ and $Li_2PO_4.\frac{1}{2}H_2O$ in an equal molar ratio as the mixture of lithium salts. The sample for the relative luminance of 100% is the fluorescent composition containing the conventional phosphor with the lithium content 0. As shown in this Figure, by the incorporation of lithium to the phosphor, an improvement in the relative luminance was observed.

The fluorescent display device of the present invention is characterized in that it contains the phosphor of the present invention in its fluorescent screen. Of course, it may contain the above-mentioned fluorescent composition of the present invention in its fluorescent screen.

Figure 3:
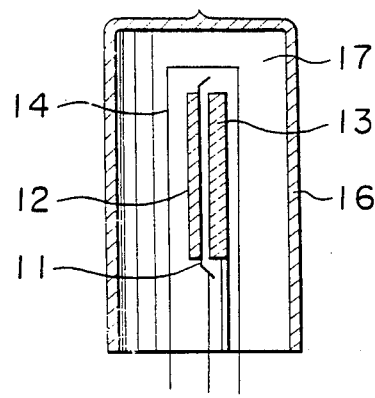
FIGS. 3 and 4 are diagrammatic views illustrating fluorescent display devices of the present invention.
Figure 4:
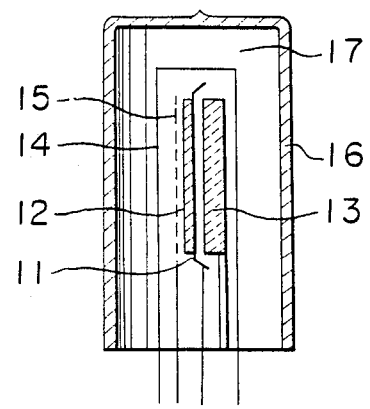

FIGS. 3 and 4 are diagrammatic views illustrating typical examples of the fluorescent display devices of the present invention. FIG. 3 illustrates a diode, and FIG. 4 illustrates a triode. As shown in FIGS. 3 and 4, in these fluorescent display devices, a fluorescent screen 12 is formed on one side of an anodic plate 11 made of e.g. an aluminum plate. The anodic plate 11 is supported by a ceramic substrate 13. A cathode 14 is provided face to face with the above fluorescent screen 12 formed on one side of the anodic plate 11. The fluorescent screen 12 emits light when excited by low-velocity electron beams emitted from this cathode 14. Particularly, in the case of the triode of FIG. 4, a grid electrode 15 is provided in the space between the cathode 14 and the fluorescent screen 12 to control or diverge the low-velocity electron beams emitted from the cathode 14. In the fluorescent display devices shown in FIGS. 3 and 4, only one cathode 14 is used. However, in the case where the fluorescent screen 12 has a wide surface area, two or more cathodes may be provided. There is no particular restriction as to the number of cathodes. The anodic plate 11 having a fluorescent screen 12 on one side thereof, the ceramic substrate 13 and the cathode 14 (FIG. 3), or the anodic plate 11 having a fluorescent screen 12 on one side thereof, the ceramic substrate 13, the cathode 14 and the grid electrode 15 (FIG. 4), are all sealed in a transparent container 16 made of e.g. glass, and the interior 17 is maintained to be in a high vacuumed condition of at least $10^{-7}$ Torr.

The fluorescent screen on the anodic plate is a flat plate, whereas the cathode is a wire-like. It is therefore preferred to provide a mesh grid electrode as a diverging electrode between the cathode and the fluorescent screen, as shown in FIG. 4. In this case, good results can be obtained when the mesh openings are made as small as possible so that the loss of luminance of the fluorescent screen is minimized and the low-velocity electron beams can efficiently be diverged. Specifically, the mesh diameter is preferably at most 500 μm, and the opening rate (the surface area of the openings for passage of the low-velocity electron beams relative to the total surface area of the grid electrode) is preferably at least 50%.

The anodic plate is divided in its electrode mode into sections required for the representation of characters or designs so that a voltage can selectively be applied to the respective electrode sections to display an optional character or design. Further, it is possible to obtain a fluorescent display device capable of displaying a multicolored representation, if the anodic plate is divided into dots or into lines, a phosphor screen containing the phosphor for emission of light under low-velocity electron excitation of the present invention is formed on a part of such divided electrodes and a phosphor screen containing a phosphor for emission of light under low-velocity electron excitation having an emitting color different from the emitting color of the above phosphor is formed on the other part of electrodes.

The fluorescent display devices of the present invention may be prepared, for instance, by the following method.

Firstly, the above-mentioned phosphor or fluorescent composition of the present invention is mixed with a suitable organic binder to prepare an ink containing the phosphor. Then, the ink is poured onto a silk screen placed on the anode, and a fluorescent screen is formed on the anodic plate by rubbing the silk screen with a squeegee. The fluorescent screen thus formed is baked in the air to decompose the organic binder present in the fluorescent screen. The process for the preparation of the fluorescent screen for the fluorescent display devices of the present invention is not restricted to such a screen printing method. Further, a plurality of phosphors (including phosphors other than those of the present invention) may be incorporated into the fluorescent screen. The material of the anodic plate may not necessarily be uniform, and may, for example, be formed with a variety of patterns. However, the anodic plate is preferably flat. Then, a cathode made of e.g. a tungsten wire heater coated with an electron emitter such as $BaCO_3$ or $SrCO_3$, is disposed face to face with the fluorescent screen on the anodic plate with a space of not more than 5 mm. Then, the pair of such electrodes and a getter such as Ba or Ti are placed in a transparent container made of e.g. glass, and the gas in the container is subjected to baking, and while vacuuming the container by a vacuum pump such as a rotary pump, electricity is applied to the cathode to activate the electron emitter. When the interior of the container reached to a vacuumed level of at least $10^{-3}$ Torr, the sealing of the container is conducted. After the sealing, the getter is emitted to further increase the degree of vacuum in the container. Thus, a fluorescent display device of the present invention is obtained.

As mentioned in the foregoing, the present invention provides a phosphor, a fluorescent composition and a fluorescent display device which is capable of providing remarkable high luminance under low-velocity electron excitation at an acceleration voltage of at most 1 KV, particularly at most 100 V, by incorporating lithium into the $(Zn_{1-x},Cd_x)S$ phosphors. Thus, the industrial value of the present invention is extremely high.

Now, the present invention will be described with reference to the Examples. However, it should be understood that the present invention is by no means restricted to these specific Examples.

EXAMPLE 1

The following materials were thoroughly mixed.

| | |
|---|---|
| Zinc sulfide (ZnS), phosphor grade reagent | 137.5 g |
| Cadmium sulfide (CdS), phosphor grade reagent | 87.5 g |
| CdS containing 2000 ppm of silver | 25 g |
| Lithium chloride (LiCl), special grade reagent | 2.5 g |

The mixture was placed in a quartz crucible, then fired in an electric furnace at 800° C. for 2 hours, subjected to levigation, washed with water until the electric conductivity of the supernatant became 3 μs/cm, dehydrated and dried to obtain a $(Zn_{0.65},Cd_{0.35})S:Li,Ag,Cl$ phosphor containing 6.5 ppm of lithium relative to 1 g of $(Zn_{0.65},Cd_{0.35})S\ Ag,Cl$.

This phosphor was mixed with a binder comprising ethyl cellulose and carbitol to obtain an ink, which was then coated on a plate by means of a 250 mesh silk screen, then heated at 450° C. for 30 minutes, and dried at 100° C. for 30 minutes to form a fluorescent screen A.

On the other hand, a $(Zn_{0.65},Cd_{0.35})S:Ag,Cl$ phosphor containing no lithium was separately prepared, and a fluorescent screen A' was formed in the same manner as the preparation of the above fluorescent screen.

The fluorescent screens A and A' were placed in a vacuumed container, and excited by low-velocity electron beams at 50 V, whereby the fluorescent screen A showed a relative luminance of a level about 30 times the luminance of the fluorescent screen A'.

EXAMPLE 2

A ZnS:Li,Cl phosphor containing 320 ppm of lithium (added in the form of LiCl) relative to 1 g of ZnS:Cl, was prepared. On the other hand, a ZnS:Cl phosphor containing 10 ppm of lithium relative to 1 g of ZnS:Cl was prepared for the purpose of comparison. By using these phosphors, fluorescent screens were prepared, then placed in a vacuumed container and excited by low-velocity electron beams at 50 V in the same manner as in Example 1, whereby the ZnS:Li,Cl fluorescent screen exhibited a luminance of a level 5 times the luminance of the ZnS:Cl fluorescent screen.

EXAMPLE 3

A $(Zn_{0.9},Cd_{0.1})S:Li,Au,Al$ phosphor containing 1000 ppm of lithium (LiCl, $Li_2SO_4 \cdot H_2O$ and $Li_3PO_4 \cdot \frac{1}{2}H_2O$ are added in equimolar amounts) relative to 1 g of $(Zn_{0.9},Cd_{0.1})S: Au,Al$, was prepared. On the other hand, a $(Zn_{0.9},Cd_{0.1})S: Au,Al$ phosphor containing no lithium was prepared for the purpose of comparison. By using these phosphors, fluorescent screens were prepared and excited by low-velocity electron beams at 50 V in a vacuumed container in the same manner as in Example 1, whereby the $(Zn_{0.9},Cd_{0.1})S:Li,Au,Al$ fluorescent screen exhibited a luminance of a level 3.5 times the luminance of the $(Zn_{0.9},Cd_{0.1})S:Au,Al$ fluorescent screen.

EXAMPLE 4

A $(Zn_{0.7},Cd_{0.3})S:Li,Na,Ag,Al$ phosphor containing 400 ppm of lithium (LiCl, $Li_2SO_4 \cdot H_2O$ and $Li_3PO_4 \cdot \frac{1}{2}H_2O$ were added in equimolar amounts) relative to 1 g of $(Zn_{0.7},Cd_{0.3})S:Ag,Al$ and 7 ppm of Na, was prepared. On the other hand, a $(Zn_{0.7},Cd_{0.3})S:Ag,Al$ phosphor containing no lithium was prepared for the purpose of comparison. By using these phosphors, fluorescent screens were prepared and excited by low-velocity electron beams at 50 V in a vacuumed container in the same manner as in Example 1, whereby the $(Zn_{0.7},Cd_{0.3})S:Li,Ag,Al$ fluorescent screen exhibited a luminance of a level 4 times the luminance of the $(Zn_{0.7},Cd_{0.3})S:Ag,Al$ fluorescent screen.

EXAMPLE 5

A fluorescent composition prepared by mixing 9 parts by weight of the lithium-containing phosphor of Example 1 and 1 part by weight of $In_2O_3$, was screen-printed to form a fluorescent screen B. On the other hand, a fluorescent screen B' was prepared in the same manner as above by using a fluorescent composition prepared by mixing 9 parts by weight of the phosphor of Example 1 containing no lithium and 1 part by weight of $In_2O_3$ for the purpose of comparison. These fluorescent screens were placed in a vacuumed container, and excited by low-velocity electron beams at 30 V, whereby the fluorescent screen B exhibited a luminance of a level 9 times the luminance of the fluorescent screen B'.

EXAMPLE 6

A fluorescent composition prepared by mixing 6 parts by weight of the lithium-containing phosphor of Example 2 and 4 parts by weight of $In_2O_3$, was screen-printed to form a fluorescent screen C. On the other hand, a fluorescent screen C' was formed in the same manner as above by using a fluorescent composition prepared by mixing 6 parts by weight of the phosphor of Example 2 containing no lithium and 4 parts by weight of $In_2O_3$ for the purpose of comparison. These fluorescent screens were placed in a vacuumed container, and excited by low-velocity electron beams at 30 V, whereby the fluorescent screen C exhibited a luminance of a level 5 times the luminance of the fluorescent screen C'.

EXAMPLE 7

A fluorescent composition prepared by mixing 8 parts by weight of the lithium-containing phosphor of Example 3 and 2 parts by weight of $In_2O_3$, was screen-printed to form a fluorescent screen D. On the other hand, a fluorescent screen D' was prepared in the same manner as above by using a fluorescent composition prepared by mixing 8 parts by weight of the phosphor of Example 3 containing no lithium and 2 parts by weight of $In_2O_3$ for the purpose of comparison. These fluorescent screens were placed in a vacuumed container, and excited by low-velocity electron beams at 30 V, whereby the fluorescent screen D exhibited a luminance of a level 10 times the luminance of the fluorescent screen D'.

EXAMPLE 8

A fluorescent composition prepared by mixing 99 parts by weight of the lithium-containing phosphor of Example 4 and 1 part by weight of $In_2O_3$, was screen-printed to form a fluorescent screen E. On the other hand, a fluorescent screen E' was prepared in the same manner as above by using a fluorescent composition prepared by mixing 99 parts by weight of the phosphor of Example 4 containing no lithium and 1 part by weight of $In_2O_3$ for the purpose of comparison. These fluorescent screens were placed in a vacuumed container, and excited by low-velocity electron beams at 30 V, whereby the fluorescent screen E exhibited a luminance of a level 10 times the luminance of the fluorescent screen E'.

EXAMPLE 9

Fluorescent display devices were prepared by using the fluorescent screens of Examples 5 to 8 as the anode and a filament coated with a electron beam emitting substance as the cathode, and their luminance was measured respectively, whereby the same results as in Examples 5 to 8 were obtained. For the sake of convenience, in accordance with the present invention, it is also possible to represent the elements Cl, Br and I as X, and the element Al as Y, while the respective amounts of elements X and Y are designated with the notation c and d, respectively.

What is claimed is:

1. A phosphor which is capable of emitting light of high luminance under low velocity electron excitation having the formula:

$(Zn_{1-x}, Cd_x)S:aLi, bM^I, cX, dY$ wherein $0 \leq x \leq 1$, a is such that Li is present in the amount of 1–10,000 ppm, $b > 0$, $c \geq 0$ and $d \geq 0$, with the proviso that $c+d$ is greater than 0, and wherein $M^I$ is at least one element selected from the group consisting of Na, K, Ag, Rb, Cs, Au and Cu, X is at least one element selected from the group consisting of Cl, Br and I and Y is Al.

2. The phosphor for emission of light under low-velocity electron excitation according to claim 1, wherein in the formula I, $b \neq 0$, $M^I$ is Ag, and X is Cl.

3. The phosphor of claim 1, wherein said Li is present in the amount of about 35–5,000 ppm.

4. The phosphor of claim 1, wherein said element $M^I$ is Ag, Au, or a mixture of Na and Ag.

5. The phosphor of claim 1, wherein said element X is Cl.

6. A fluorescent composition comprising a phosphor which is capable of emitting light of high light of high luminance under low-velocity electron excitation having the formula:

$(Zn_{1-x}, Cd_x)S:aLi, bM^I, cX, dY$ wherein $0 \leq x \leq 1$, a is such that Li is present in the amount of 1–10,000 ppm, $b > 0$, $c \geq 0$ and $d \geq 0$, with the proviso that $c+d$ is greater than 0, and wherein $M^I$ is at least one element selected from the group consisting of Na, K, Ag, Rb, Cs, Au and Cu, X is at least one element selected from the group consisting of Cl, Br and I and Y is Al, and at least one conductive material selected from the group consisting of conductive metal oxides and conductive metal sulfides.

7. The fluorescent composition according to claim 6 wherein the conductive material is at least one conductive metal oxide selected from the group consisting of $In_2O_3$, $SnO_2$ and ZnO.

8. The fluorescent composition according to claim 6 wherein the conductive material is at least one conductive metal sulfide selected from the group consisting of $In_2S_2$, CdS, $Li_2S$ and $Cu_2S$.

9. The fluorescent composition of claim 6, wherein said phosphor contains Li in the amount of about 35–5,000 ppm.

10. The fluorescent composition of claim 6, wherein said element $M^I$ is Ag, Au or a mixture of Na and Ag.

11. The fluorescent composition of claim 6, wherein said element X in said phosphor is Cl.

12. The fluorescent composition of claim 6, wherein said conductive material is present in the amount of about 0.1 to 50% by weight relative to the phosphor.

13. A phosphor which is capable of emitting light of high luminance under low velocity electron excitation having the formula:

$$(Zn_{1-x}, Cd_x)S:aLi, bM^I, cX, dY$$

wherein $0 \leq x \leq 1$, a is such that Li is present in the amount of 1–10,000 ppm, $b > 0$, $c \geq 0$ and $d \geq 0$, with the proviso that $c+d$ is greater than 0, and wherein $M^I$ is at least one element selected from the group consisting of Ag, Au and Cu, X is at least one element selected from the group consisting of Cl, Br and I and Y is Al.

14. A fluorescent composition comprising a phosphor which is capable of emitting light of high luminance under low-velocity electron excitation having the formula:

$$(Zn_{1-x}, Cd_x)S:aLi, bM^I, cX, dY$$

wherein $0 \leq x \leq 1$, a is such that Li is present in the amount of 1–10,000 ppm, $b > 0$, $c \geq 0$ and $d \geq 0$, with the proviso that $c+d$ is greater than 0, and wherein $M^I$ is at least one element selected from the group consisting of Ag, Au and Cu, X is at least one element selected from the group consisting of Cl, Br and I and Y is Al, and at least one conductive material selected from the group consisting of conductive metal oxides and conductive metal sulfides.

* * * * *